United States Patent
Jreij et al.

(10) Patent No.: US 10,038,705 B2
(45) Date of Patent: Jul. 31, 2018

(54) SYSTEM AND METHOD FOR PERFORMING INTRUSION DETECTION IN AN INFORMATION HANDLING SYSTEM

(71) Applicant: DELL PRODUCTS, L.P., Round Rock, TX (US)

(72) Inventors: Elie Antoun Jreij, Pflugerville, TX (US); Chitrak Gupta, Bangalore (IN); Wade Andrew Butcher, Cedar Park, TX (US); Sushma Basavarajaiah, Bangalore (IN); Rama Rao Bisa, Kandukur (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/881,136

(22) Filed: Oct. 12, 2015

(65) Prior Publication Data
US 2017/0104770 A1   Apr. 13, 2017

(51) Int. Cl.
*H04L 29/06* (2006.01)

(52) U.S. Cl.
CPC .......... *H04L 63/1416* (2013.01); *H04L 63/20* (2013.01)

(58) Field of Classification Search
CPC ........ G06F 21/76; G06F 21/564; G06F 21/55; H04L 63/1416; H04L 29/06585
USPC ............................................................ 726/1
See application file for complete search history.

(56) References Cited

U.S. PATENT DOCUMENTS

| | | | |
|---|---|---|---|
| 8,098,572 B2 | 1/2012 | Zhou et al. | |
| 8,149,866 B2 | 4/2012 | Jreij et al. | |
| 8,931,095 B2 | 1/2015 | Ramsey et al. | |
| 9,009,828 B1 | 4/2015 | Ramsey et al. | |
| 9,043,909 B2 | 5/2015 | Thomas | |
| 2006/0212919 A1* | 9/2006 | Tsang | H04L 29/12028 725/111 |
| 2008/0137658 A1* | 6/2008 | Wang | H04L 12/4625 370/392 |
| 2010/0218252 A1 | 8/2010 | Ben-Shalom et al. | |
| 2011/0202983 A1* | 8/2011 | Pope | G06F 21/572 726/7 |

(Continued)

OTHER PUBLICATIONS

Zhu et al, Co-Match: Fast and Efficient Packet Inspection for Multiple Flows, Oct. 20, 2009, ACM, pp. 199-208.*

(Continued)

*Primary Examiner* — James Turchen
*Assistant Examiner* — Jenise Jackson
(74) *Attorney, Agent, or Firm* — Isidore PLLC

(57) ABSTRACT

A method and information handling system (IHS) for identifying communication threats in an IHS. The method includes triggering a board management controller (BMC) to transmit a plurality of memory addresses identifying where a plurality of network packets received by the IHS are stored. A field programmable gate array (FPGA) within a processor receives the memory addresses of the network packets and retrieves the network packets. The network packets are analyzed by comparing at least one threat signature that is associated with undesired network behavior with the contents of the network packets. In response to the at least one threat signature matching the contents of at least one of the network packets, an intrusion alert is transmitted to the BMC.

17 Claims, 8 Drawing Sheets

(56) References Cited

U.S. PATENT DOCUMENTS

| | | | |
|---|---|---|---|
| 2012/0250512 A1* | 10/2012 | Jagadeeswaran | H04L 47/12 370/235.1 |
| 2013/0262700 A1* | 10/2013 | Tamura | H04L 61/25 709/245 |
| 2013/0268745 A1* | 10/2013 | Uehata | G06F 11/1441 713/2 |
| 2013/0339713 A1* | 12/2013 | Huang | G06F 21/572 713/2 |
| 2014/0082218 A1* | 3/2014 | Yu | H04L 61/2007 709/245 |
| 2014/0233370 A1 | 8/2014 | Khare et al. | |
| 2014/0362682 A1* | 12/2014 | Guichard | H04L 41/5038 370/221 |
| 2015/0074255 A1 | 3/2015 | Davis et al. | |
| 2015/0106660 A1* | 4/2015 | Chumbalkar | G06F 11/0727 714/42 |
| 2015/0234008 A1* | 8/2015 | Miller | G01R 31/3177 714/734 |
| 2016/0308886 A1* | 10/2016 | Lee | H04L 63/1441 |

OTHER PUBLICATIONS

Lee et al, A High Performance NIDS using FPGA-Based Regular Expression Matching, 2007, ACM, pp. 1187-1191.*

* cited by examiner

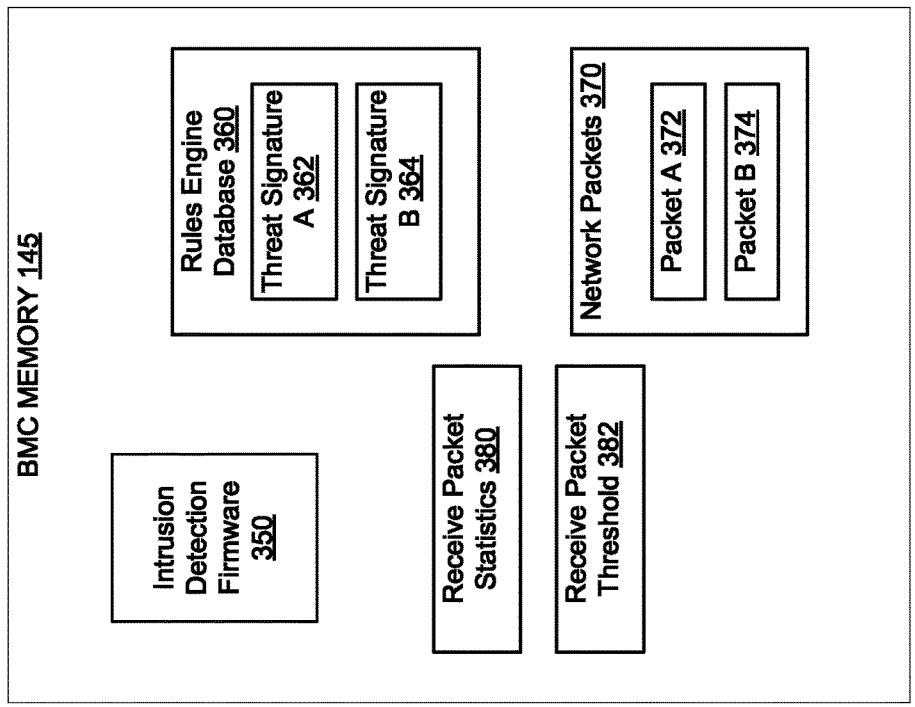
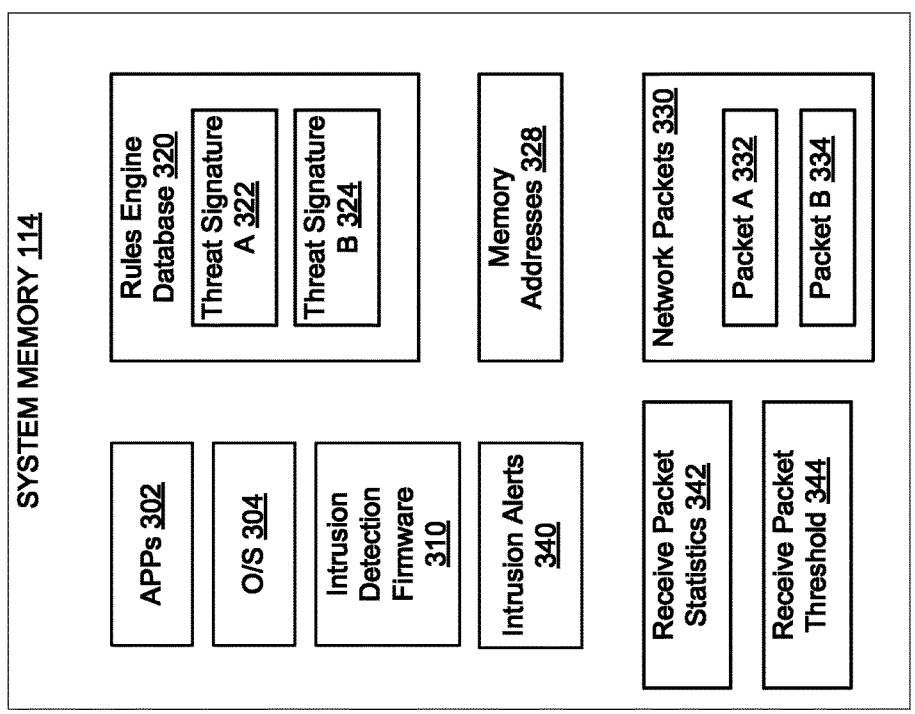
FIG. 3B
FIG. 3A

SYSTEM AND METHOD FOR PERFORMING INTRUSION DETECTION IN AN INFORMATION HANDLING SYSTEM

BACKGROUND

1. Technical Field

The present disclosure generally relates to information handling systems and in particular to a system and a method for performing intrusion detection in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled; how the information is handled; how much information is processed, stored, or communicated; and how quickly and efficiently the information may be processed, stored, or communicated. The variations in information handling systems allow for information handling systems to be general or configured for a specific user or specific use such as financial transaction processing, airline reservations, enterprise data storage, or global communications.

Businesses rely on communication networks in order to function on a daily basis. Businesses have to provide email, internet access, and other remote-access services to employees for the organization to function. The communication networks have interfaces to external communications connections or networks such as the internet. Communication networks that connect to the internet are at risk of intrusions or attack. Attacks can take any number of forms. For example, an attack can attempt to gain access to information, or to degrade the performance of the network or connected devices such as computers. Some attacks are designed to deny external access or to insert viruses onto a system.

Various systems exist that operate to prevent these attacks. For example, some networks employ firewalls to prevent unwanted access. Firewalls operate by blocking internet traffic exhibiting certain predefined characteristics, such as traffic that originates from a particular internet address, traffic that attempts to access a particular network port, or traffic that attempts to access a particular destination within the network. Firewalls are advantageous as they characterize and block internet traffic quickly. Firewalls, however, are limited in the amount of the data that can be analyzed and blocked. Firewalls also are limited by relying on knowledge by the network administrator of the type of traffic that should be blocked.

Some networks add devices known as an intrusion detection system to make up for some of the failings of a firewall. The intrusion detection system is installed just behind the firewall, and is used to provide further analysis of traffic that is not blocked by the firewall. The intrusion detection system provides a more extensive analysis of incoming communications such as analyzing traffic in a distributed denial-of-service attack. Unfortunately, the additional analysis required in using an intrusion detection system can significantly slow network traffic. The use of an intrusion detection system can also be complex and expensive, requiring additional hardware and software resources in order to be implemented.

BRIEF SUMMARY

Disclosed are a method and an information handling system (IHS) for identifying communication threats in an IHS.

According to one embodiment, the method for identifying communication threats in an information handling system (IHS) includes triggering a baseboard management controller (BMC) to transmit a plurality of memory addresses identifying where a plurality of network packets received by the IHS are stored. A field programmable gate array (FPGA) within a processor receives the memory addresses of the network packets and retrieves the network packets. The network packets are analyzed by comparing at least one threat signature that is associated with undesired network behavior with the contents of the network packets. In response to the at least one threat signature matching the contents of at least one of the network packets, an intrusion alert is transmitted to the BMC and the BMC alerts an administrator about the threat.

According to another embodiment, an IHS includes a processor and a memory device communicatively coupled to the processor via a platform controller hub (PCH). The processor has a field programmable gate array (FPGA). The processor is further communicatively coupled to a board management controller (BMC) via the PCH. The FPGA includes firmware executing thereon to enable identification of communication threats contained in received network packets. The firmware configures the FPGA to trigger the BMC to transmit a plurality of memory addresses identifying where a plurality of network packets received by the IHS are stored and receive the memory addresses of the network packets. The FPGA retrieves the network packets from the memory device and analyzes the network packets by comparing at least one threat signature that is associated with undesired network behavior with the contents of the network packets. In response to at least one threat signature matching the contents of at least one of the network packets, an intrusion alert is transmitted to the BMC.

The above summary contains simplifications, generalizations and omissions of detail and is not intended as a comprehensive description of the claimed subject matter but, rather, is intended to provide a brief overview of some of the functionality associated therewith. Other systems, methods, functionalities, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A illustrates example contents of a system memory that includes firmware for identifying communication threats, in accordance with one embodiment;

FIG. 3B illustrates example contents of a BMC memory that includes firmware for identifying communication threats, in accordance with one embodiment;

DETAILED DESCRIPTION

The illustrative embodiments provide a method and an information handling system (IHS) for identifying (and responding to the identification of) communication threats in an IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
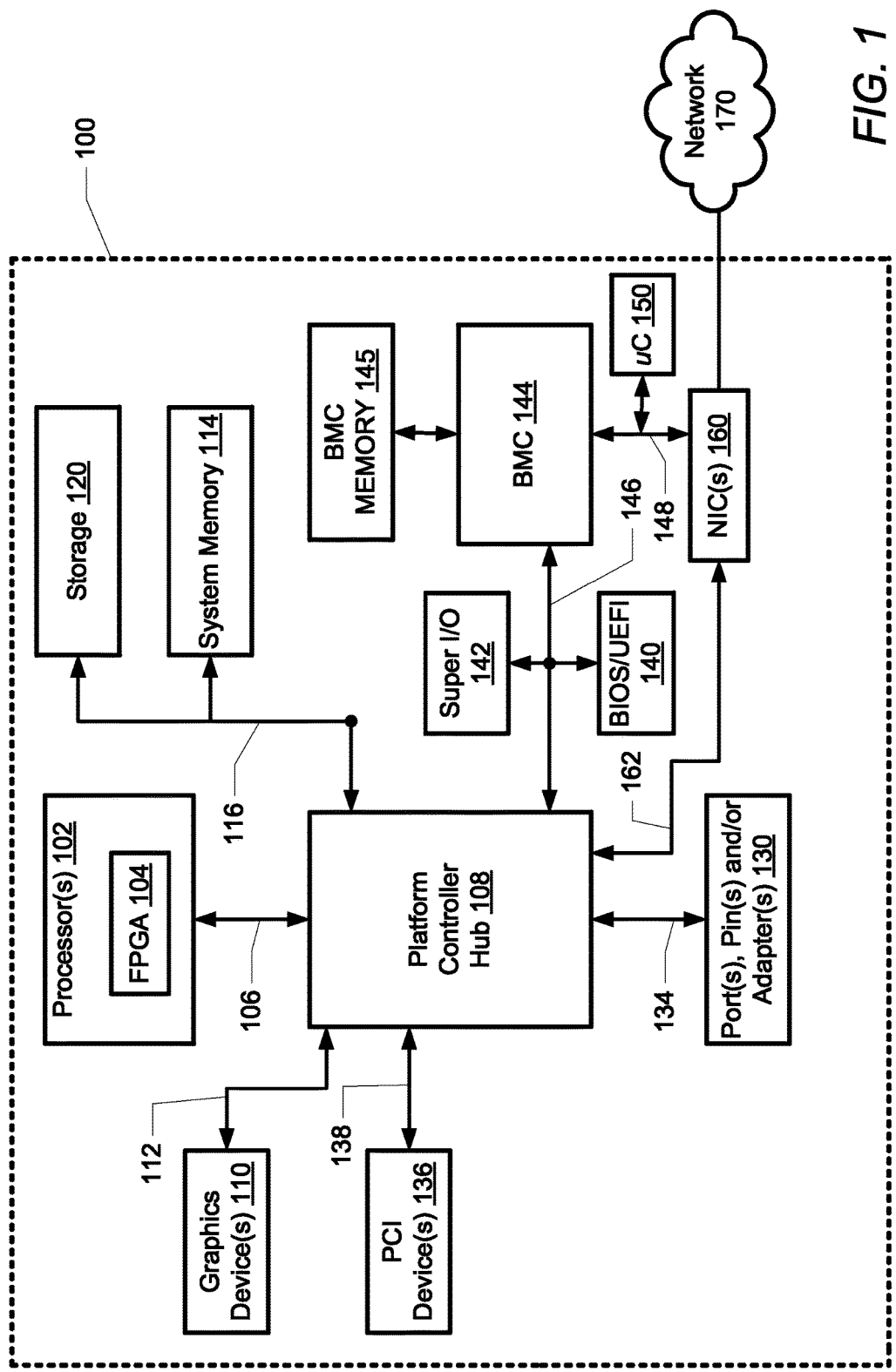
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor 102 can include an integrated field programmable gate array (FPGA) 104 that is formed within processor 102. FPGA 104 contains an array of programmable logic blocks and a hierarchy of reconfigurable interconnects that allow the blocks to be "wired together", like many logic gates that can be inter-wired in different configurations. The logic blocks can be configured to perform simple or complex combinational functions.

Processor(s) 102 may include any processor capable of executing program instructions and having an integrated FPGA 104. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to graphics device(s)

110 (e.g., one or more video cards or adaptors, etc.) via a graphics bus 112 (e.g., an Accelerated Graphics Port or AGP bus, a Peripheral Component Interconnect (PCI) bus, etc.). PCH 108 is also coupled to system memory 114 via memory bus 116. Memory 114 may be configured to store program instructions and/or data accessible by processor(s) 102. In various embodiments, memory 114 may be implemented using any suitable memory technology, such as static RAM (SRAM), synchronous dynamic RAM (SDRAM), nonvolatile/Flash-type memory, or any other type of memory.

Also coupled to memory bus 116 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100. PCH 108 is also coupled to one or more PCI devices 136 (e.g., modems, network cards, sound cards, video cards, shared memory etc.) via a PCI bus 138.

PCH 108 is further coupled to port(s), pin(s), and/or adapter(s) 130 over a bus 134. Generally, PCH 108 may be configured to handle various I/O operations, and PCH 108 may provide interfaces such as, for instance, Universal Serial Bus (USB), audio, serial, parallel, Ethernet, etc., via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is also coupled to basic input output system/unified extensible firmware interface (BIOS/UEFI) 140, super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processors(s) 102 to enable remote management of IHS 100. For example, BMC 144 may enable a user to discover, monitor, configure, update, troubleshoot and manage IHS 100 and its components, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. BMC 144 is also coupled to BMC memory 145. Certain software and/or firmware modules stored in BMC memory 145 can be executed by BMC 144. Processor(s) 102 and BMC 144 include specific firmware that enables processor(s) 102 and BMC 144 to perform the various functions described herein.

Super I/O Controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108.

IHS 100 further comprises one or more network interface controllers (NIC(s)) 160 coupled to PCH 108 via a PCI bus 162. NIC(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NIC 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

BMC 144 is communicatively coupled to NIC(s) 160 via a sideband bus 148. Sideband bus 148 allows BMC 144 to receive incoming communication packets from NIC(s) 160. A micro-controller (uC) 150 is also communicatively coupled to sideband bus 148 allowing micro-controller (uC) 150 to also receive incoming communication packets from NIC(s) 160.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or BMC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

Figure 2:
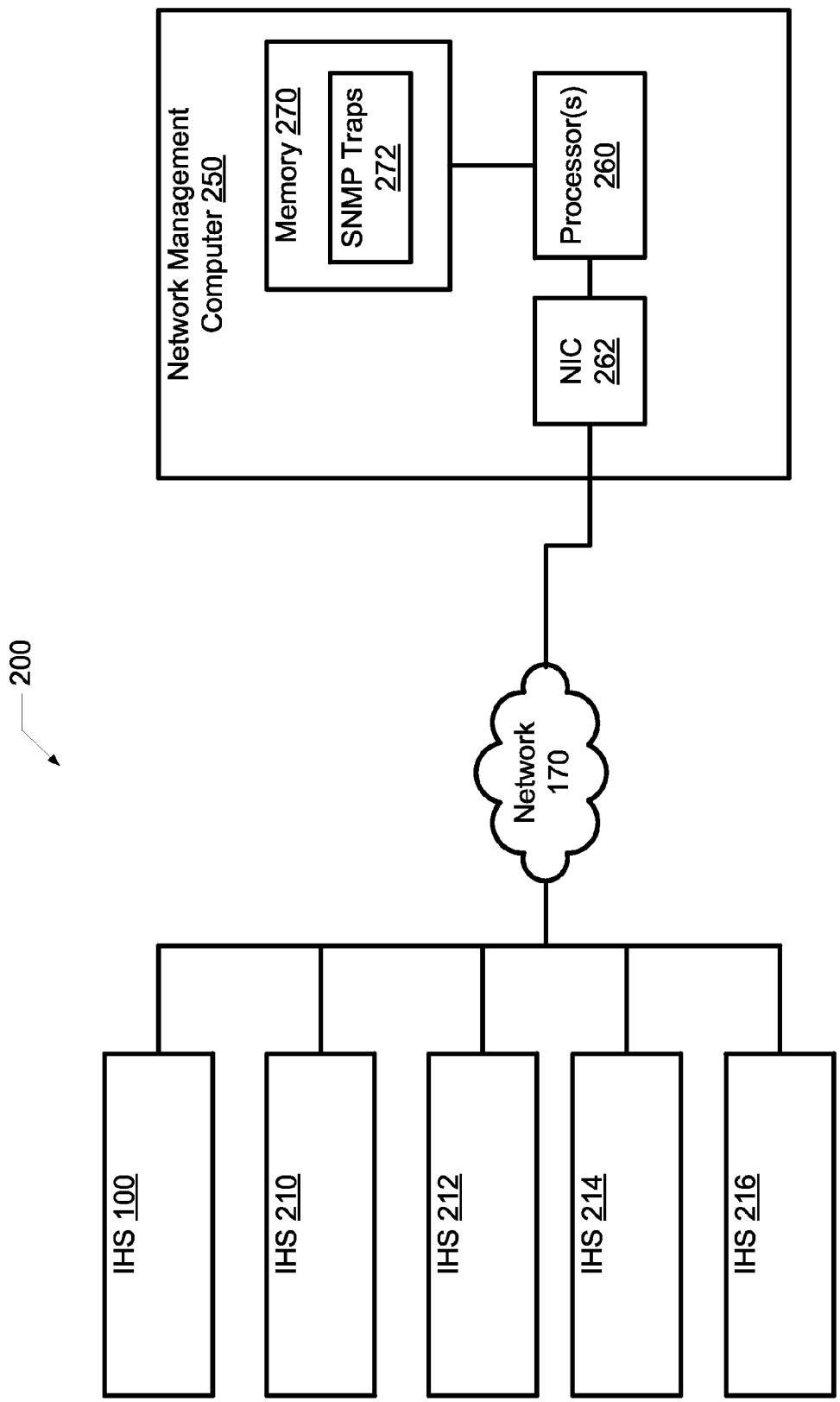
FIG. 2 illustrates an example networked computing environment, including multiple IHSs and a network management computer in communication via a network, according to one or more embodiments.

Referring to FIG. 2, a networked computing environment or system 200 is shown. In the description of the following figures, reference is also made to specific components illustrated within each of the preceding figures. Networked computing system 200 includes other distributed computing devices or systems such as secondary IHSs 210, 212, 214 and 216 that are communicatively coupled along with IHS 100 to a network management computer 250. In one embodiment, IHSs 210-216 can be located in the same data center as IHS 100. In another embodiment, IHSs 210-216 can be located in a plurality of (various) different physical locations. In another embodiment, networked computing system 200 can also include secondary servers and blades.

Network management computer 250 can control and manage operations of networked computing environment or system 200. Network management computer 250 includes one or more processor(s) 260 that are coupled to a memory 270 and NIC 262. NIC 262 enables network management computer 250 to communicate and/or interface with IHS 100 and IHSs 210-216 via network 170 using one or more communication protocols. In one embodiment, memory 270 can store one or more simple network management protocol (SNMP) traps 272 that are received from BMC 144. SNMP is an internet protocol for managing devices on IP networks and is used to monitor attached network devices. The SNMP traps 272 enable an agent to notify network management computer 250 of significant events by way of unsolicited message.

With reference now to FIG. 3A, one embodiment of example contents of system memory 114 of IHS 100 is shown. System memory 114 includes data, software, and/or firmware modules including application(s) 302, and operating system (O/S) 304. System memory 114 also includes intrusion detection firmware module 310 that enables the analysis of network packets in order to identify communication threats in IHS 100. Intrusion detection firmware module 310 is a software and/or firmware module that executes on FPGA 104 to facilitate analysis of network packets received from network 170.

System memory 114 further includes a rules engine database 320. Rules engine database 320 stores various threat signatures such as threat signature A 322 and threat signature B 324. In one embodiment, rules engine database 320 can also be stored in storage 120. Threat signatures 322 and 324 are unique strings of bits, or binary patterns that are present in viruses, malware and other malicious code. The threat signature is like a fingerprint in that it can be used to detect and identify specific viruses and other malware. Intrusion detection firmware module 310 uses the threat signatures 322 and 324 to identify network packets containing malicious code.

System memory 114 further contains memory addresses 328 received from BMC 144 and identifying where network packets received by the IHS 100 are stored. System memory 114 also stores network packets 330 including network packet A 332 and network packet B 334. Network packets 330 are formatted units of data received from network 170. System memory 114 also contains intrusion alerts 340. Intrusion alerts 340 are generated when the contents of one or more network packets 330 are found to contain one or more threat signatures.

Turning to FIG. 3B, one embodiment of example contents of BMC memory 145 of IHS 100 is shown. BMC memory 145 includes intrusion detection firmware module 350 that enables the analysis of network packets in order to identify communication threats in IHS 100. Intrusion detection firmware module 350 is a software and/or firmware module that executes on BMC 144 to facilitate analysis of network packets 370 received from network 170.

BMC memory 145 further includes a rules engine database 360. Rules engine database 360 stores various threat signatures such as threat signature A 362 and threat signature B 364. Threat signatures 362 and 364 are unique strings of bits, or binary patterns that are present in viruses, malware and other malicious code. The threat signature is like a fingerprint in that it can be used to detect and identify specific viruses and other malware. Intrusion detection firmware module 350 uses the threat signatures 362 and 364 to identify network packets containing malicious code.

BMC memory 145 also contains network packets 370 including network packet A 372 and network packet B 374. Network packets 370 are formatted units of data received from network 170. BMC memory 145 also contains receive packets statistics 380 and receive packet threshold 382. In one embodiment, receive packets statistics 380 can include the number of network packets received during a time period and the physical and IP address of the network packets. Receive packet threshold 382 is a number of received network packets that is determined by BMC 144 as being indicative of a denial-of-service (DOS) attack on IHS 100. The DOS is an attempt to make the IHS 100 unavailable to its intended users by temporarily or indefinitely interrupting or suspending services of an IHS 100 connected to the Internet.

In one embodiment, FPGA 104 executes intrusion detection firmware 310 to enable identification of communication threats contained in received network packets 330. The firmware 310 configures the FPGA 104 to trigger the BMC 144 to transmit a plurality of memory addresses 328 identifying where a plurality of network packets received by the IHS are stored and to receive the memory addresses 328 of the network packets. The FPGA 104 retrieves the network packets 330 from the system memory 114 and analyzes the network packets by matching at least one threat signature 322 and/or 324 that is associated with undesired network behavior with the contents of the network packets. In response to at least one threat signature matching the contents of at least one of the network packets, an intrusion alert 340 is transmitted to the BMC 144.

Figure 4:
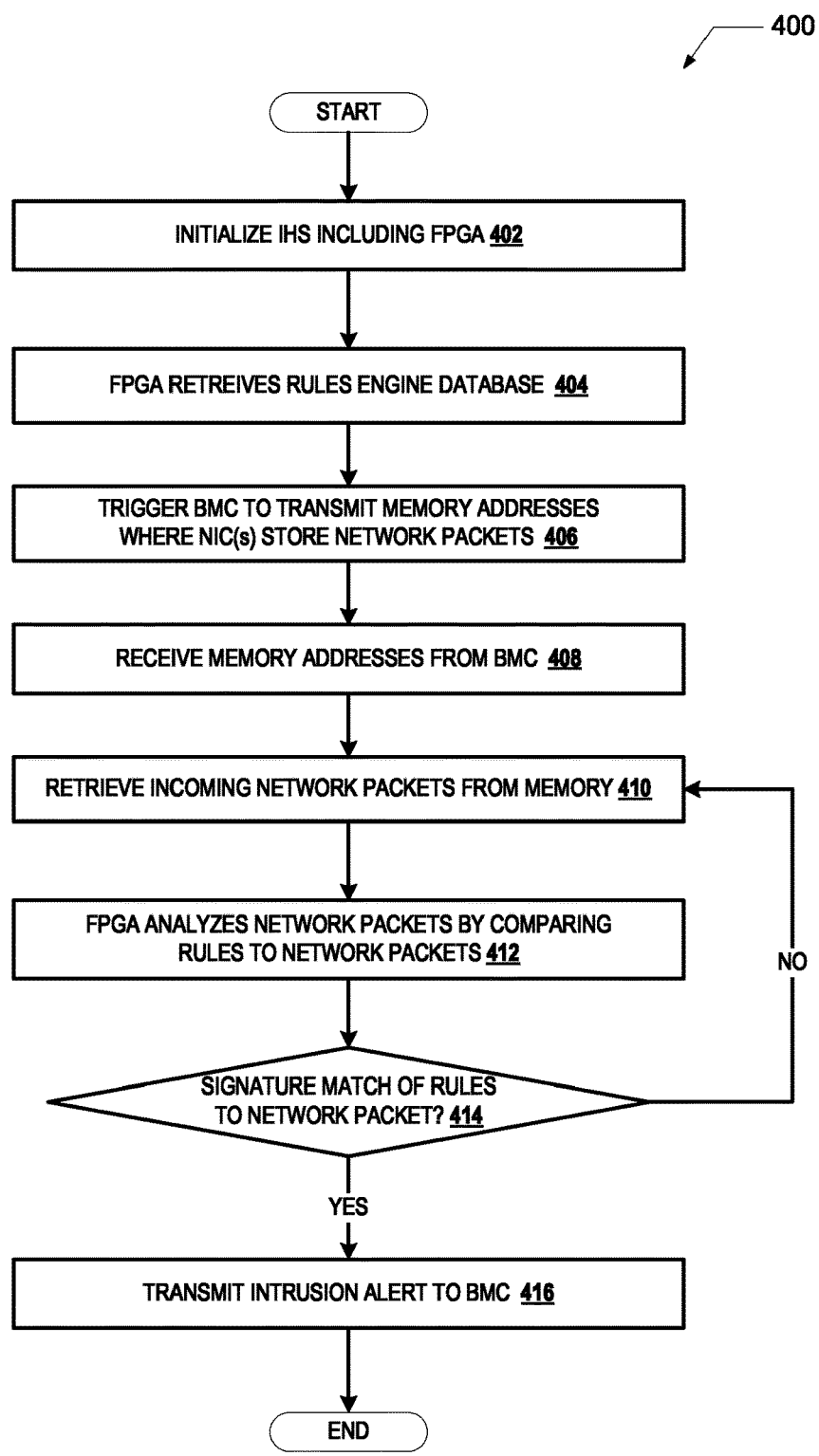
FIG. 4 is a flow chart illustrating one example of a method for identifying communication threats in an IHS.

FIG. 4 illustrates a flowchart of an exemplary method 400 by which FPGA 104 within the preceding figures performs different aspects of the processes that enable the one or more embodiments of the disclosure. Generally, method 400 represents a computer-implemented method for analyzing and identifying communication threats in an IHS. The description of method 400 is provided with general reference to the specific components illustrated within the preceding FIGS. 1-3B. Generally, method 400 is described as being implemented via FPGA 104 and particularly the execution of code provided by intrusion detection firmware 310 acting within FPGA 104. It is however appreciated that certain aspects of the described methods may be implemented via other processing devices and/or execution of other code.

Referring to the flow chart of FIG. 4, method 400 begins at the start block and proceeds to block 402 where IHS 100 and FPGA 104 are initialized. The initialization can include loading of BIOS/UEFI 140 and/or OS 304 and establishing communication with other connected devices of IHS 100 and network 200. FPGA 104 retrieves rules engine database 320 including threat signatures 322 and 324 from system memory 114 (block 404). FPGA 104 triggers BMC 144 to transmit the memory addresses 328 identifying where network packets 330 received by the IHS are stored (block 406). FPGA 104 receives the memory addresses 328 of the network packets 330 (block 408) and retrieves the network packets 330 (block 410).

FPGA 104 analyzes the network packets 330 by comparing the threat signatures 322, 324 that are associated with undesired network behavior with the contents of the network packets 330 (block 412). At decision block 414, FPGA 104 determines if at least one of the threat signatures 322, 324 matches the contents of at least one of the network packets 330. In response to at least one of the threat signatures 322 and/or 324 not matching the contents of at least one of the network packets 330, FPGA 104 continues to retrieve (block 410) and analyze (block 412) new received network packets 330. In response to at least one of the threat signatures 322, 324 matching the contents of at least one of the network packets 330, an intrusion alert 340 is transmitted to the BMC 144 (block 416). Method 400 then ends.

Figure 5A:
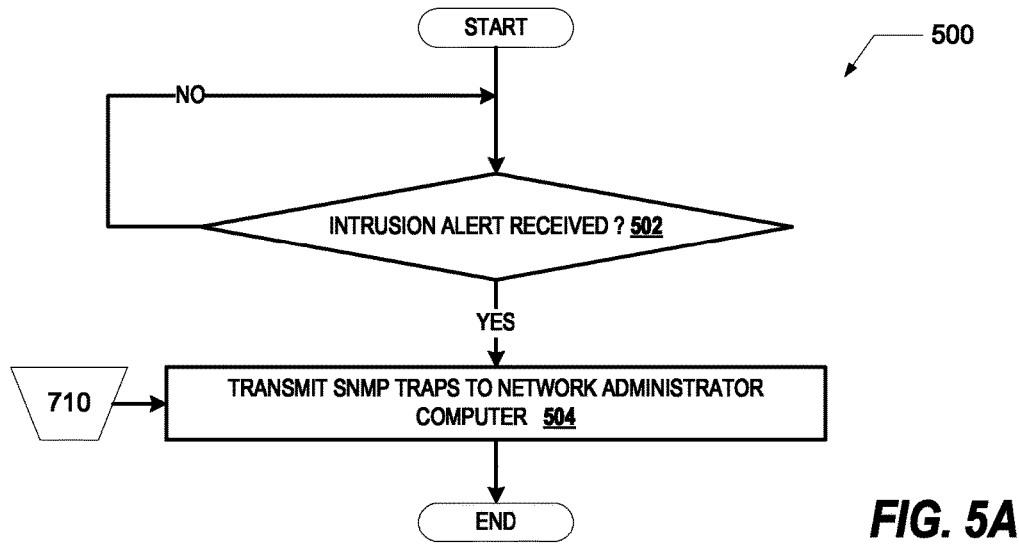
FIG. 5A is a flow chart illustrating one example of a method of responding to identifying a communication threat in an IHS.
Figure 5B:
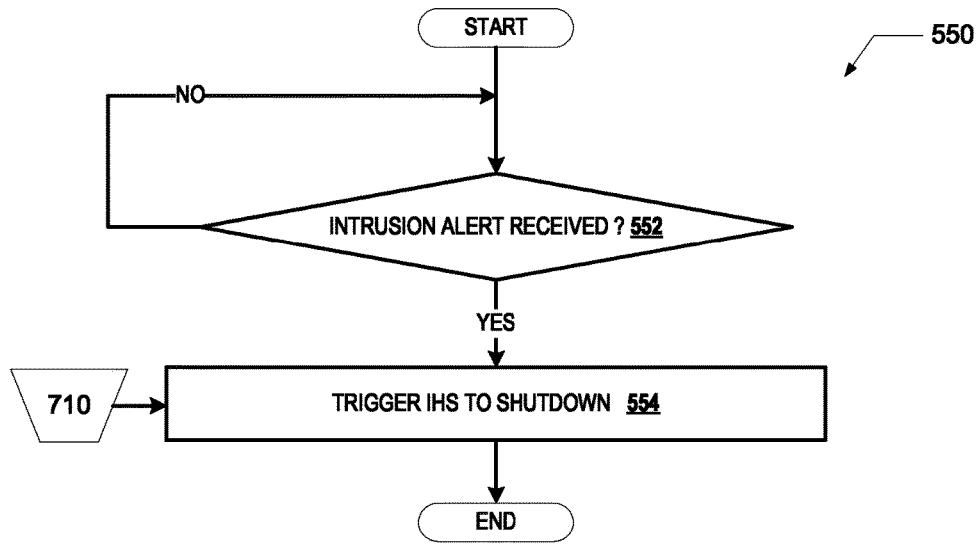
FIG. 5B is a flow chart illustrating another example of a method of responding to identifying a communication threat in an IHS.
Figure 6:
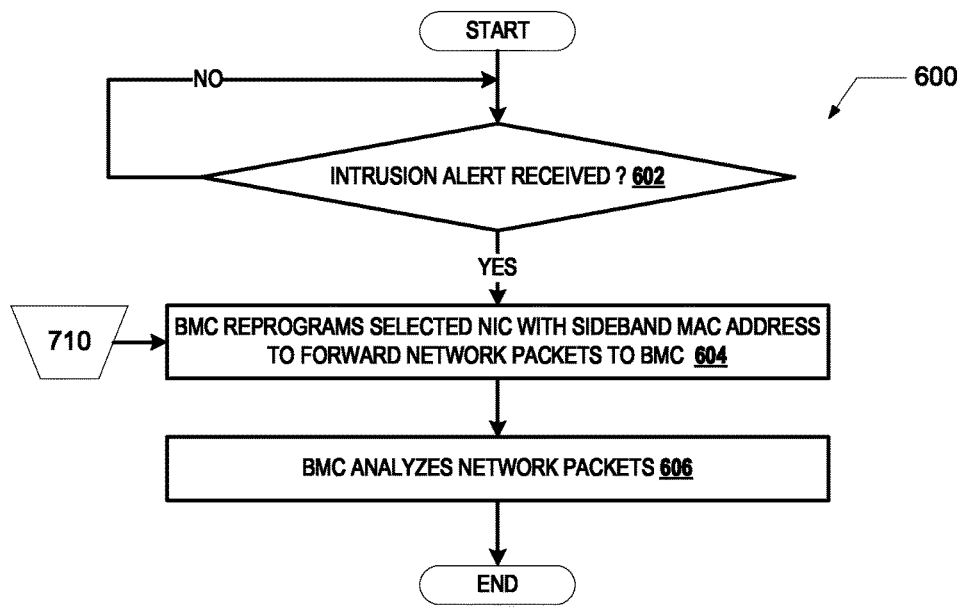
FIG. 6 is a flow chart illustrating an additional example of a method of responding to identifying a communication threat in an IHS.

FIGS. 5A, 5B and 6 illustrate flowcharts of exemplary methods 500, 550 and 600 by which BMC 144 within the preceding figures performs different aspects of the processes that enable the one or more embodiments of the disclosure. Generally, methods 500, 550 and 580 represent computer-implemented methods for responding to the identification of communication threats in an IHS. The description of methods 500, 550 and 600 are provided with general reference to the specific components illustrated within the preceding FIGS. 1-3B. Generally, methods 500, 550 and 600 are described as being implemented via BMC 144 and particularly the execution of code provided by intrusion detection firmware 350 acting within BMC 144. It is however appreciated that certain aspects of the described methods may be implemented via other processing devices and/or execution of other code.

Referring to the flow chart of FIG. 5A, methods 500 begins at the start block and proceeds to decision block 502 where BMC 144 determines if an intrusion alert 340 has been received from FPGA 104. In response to BMC 144 not receiving an intrusion alert 340 from FPGA 104, BMC 144 continues to monitor for receipt of an intrusion alert 340 (block 502). In response to BMC 144 receiving an intrusion alert 340 from FPGA 104, BMC 144 transmits a SNMP trap 272 to network management computer 250 via network 170 (block 504). The SNMP trap 272 alerts network management computer 250 of a communication threat such that network management computer 250 can take appropriate action. Method 500 then ends.

Referring to the flow chart of FIG. 5B, method 550 begins at the start block and proceeds to decision block 552 where BMC 144 determines if an intrusion alert 340 has been received from FPGA 104. In response to BMC 144 not receiving an intrusion alert 340 from FPGA 104, BMC 144 continues to monitor for receipt of an intrusion alert 340 (block 552). In response to BMC 144 receiving an intrusion alert 340 from FPGA 104, BMC 144 triggers IHS 100 to shutdown (block 554). Method 550 then ends.

Referring to the flow chart of FIG. 6, method 600 begins at the start block and proceeds to decision block 602 where BMC 144 determines if an intrusion alert 340 has been received from FPGA 104. In response to BMC 144 not receiving an intrusion alert 340 from FPGA 104, BMC 144 continues to monitor for receipt of an intrusion alert 340. In response to BMC 144 receiving an intrusion alert 340 from FPGA 104, BMC 144 reprograms one or more NIC(s) 160 associated with receipt of the network packets matching a threat signature with the media access control (MAC) address of sideband bus 148 (block 604). The BMC 144 causes NIC(s) 160 to be re-programmed with a new MAC address such that NIC(s) 160 forward received network packets to BMC 144. BMC 144 analyzes the network packets for matches to threat signatures 322 and 324 (block 606). Method 600 then ends.

Figure 7:
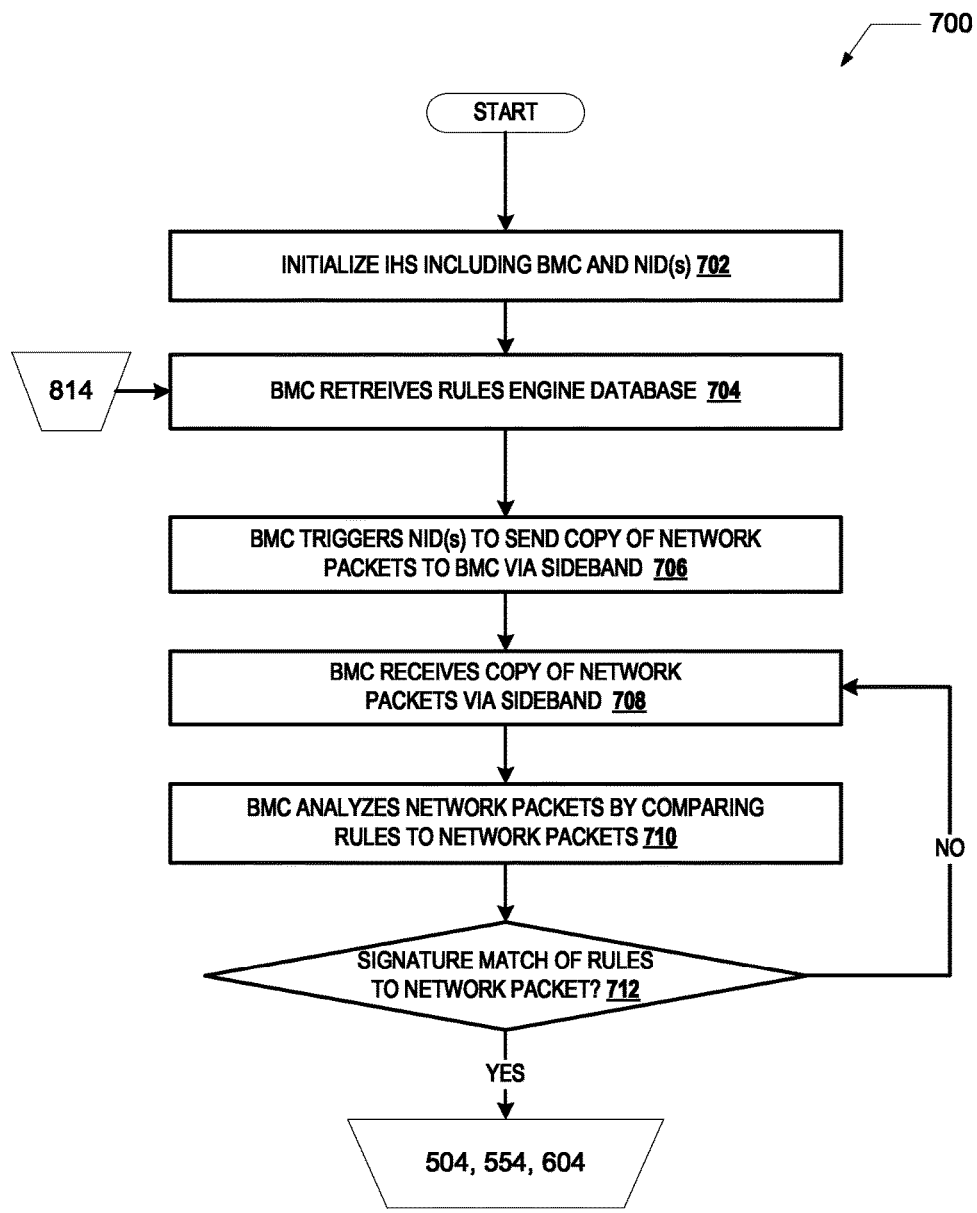
FIG. 7 is a flow chart illustrating another example of a method for identifying communication threats in an IHS.
Figure 8:
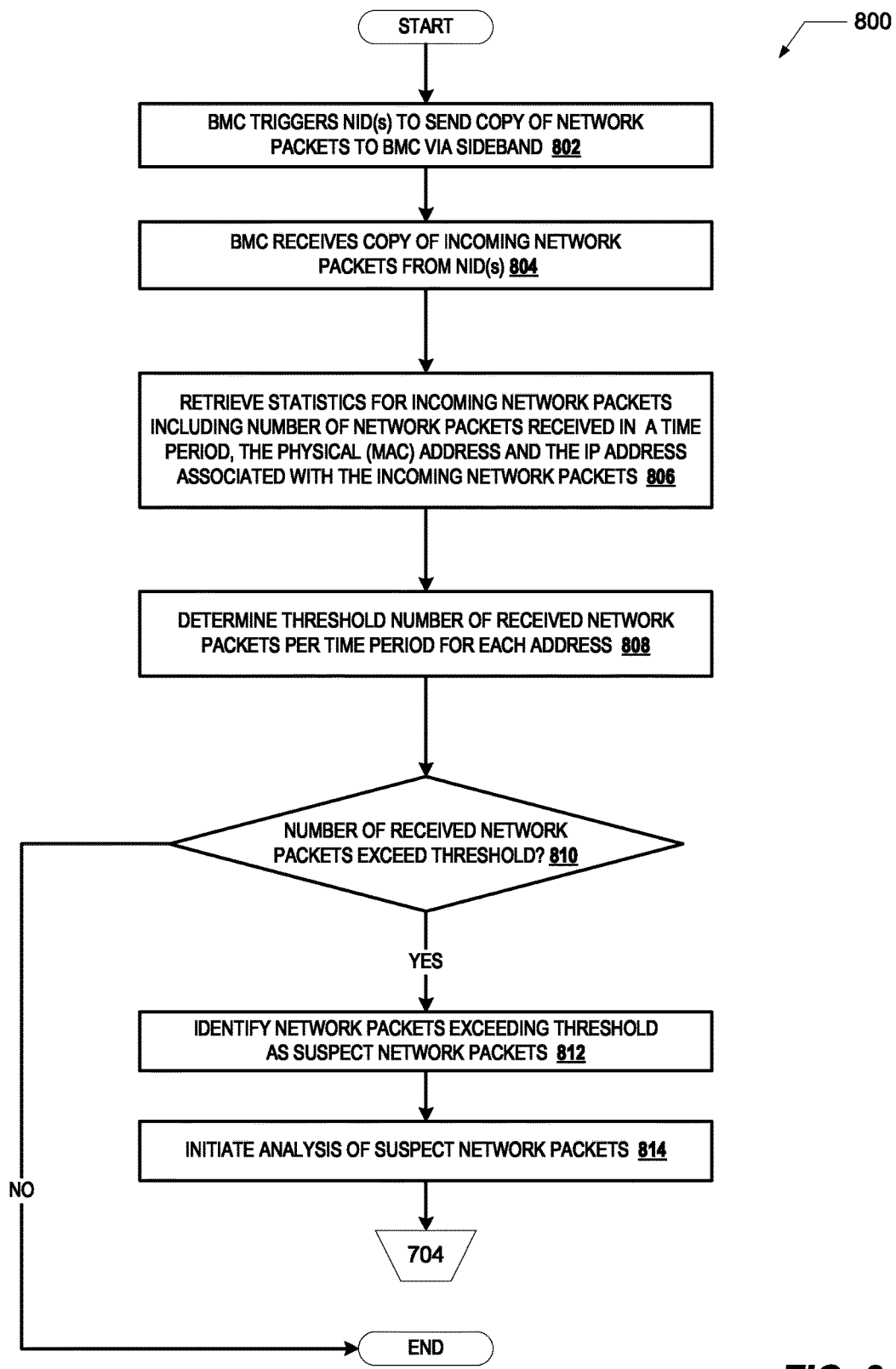
FIG. 8 is a flow chart illustrating an additional example of a method for identifying communication threats in an IHS.

FIGS. 7 and 8 illustrate flowcharts of exemplary methods 700 and 800 by which BMC 144 within the preceding figures performs different aspects of the processes that enable the one or more embodiments of the disclosure. Generally, methods 700 and 800 represent computer-implemented methods for responding to the identification of communication threats in an IHS. The description of methods 700 and 800 is provided with general reference to the specific components illustrated within the preceding FIGS. 1-3B. Generally, methods 700 and 800 are described as being implemented via BMC 144 and particularly the execution of code provided by BMC firmware 145 acting within BMC 144. It is however appreciated that certain aspects of the described methods may be implemented via other processing devices and/or execution of other code.

Referring to the flow chart of FIG. 7, method 700 begins at the start block and proceeds to block 702 where IHS 100, including BMC 144 and NIC(s) 160, is initialized. The initialization can include loading of BIOS/UEFI 140 and OS 304 and establishing communication with other connected devices of IHS 100 and network 200. BMC 144 retrieves rules engine database 320 including signature threats 322 and 324 from system memory 114 (block 704). BMC 144 triggers the NIC(s) 160 to transmit a copy of the network packets 330 to BMC 144 via sideband bus 148 (block 706). BMC 144 receives the copy of the network packets (block 708).

BMC 144 analyzes the copy of the network packets by comparing the threat signatures 322, 324 that are associated with undesired network behavior with the contents of the copy of the network packets (block 710). At decision block 712, BMC 144 determines if at least one of the threat signatures 322, 324 matches the contents of at least one of the copies of the network packets. In response to at least one of the threat signatures 322, 324 not matching the contents of at least one of the copies of the network packets, BMC 144 continues to receive (block 708) and analyze (block 710) new received copies of the network packets. In response to at least one of the threat signatures 322, 324 matching the contents of at least one of the copies of the network packets 330, BMC 144 can take one or more of three actions.

In one embodiment, BMC 144 transmits a SNMP trap 272 to network management computer 250 via network 170 (block 504 of FIG. 5A). The SNMP trap 272 alerts network management computer 250 of a communication threat such that network management computer 250 can take appropriate action. In another embodiment, BMC 144 triggers IHS 100 to shutdown (block 554 of FIG. 5B). In an additional embodiment, BMC 144 reprograms one or more NIC(s) 160 associated with receipt of the network packets matching a threat signature with the media access control (MAC) address of sideband bus 148 (block 604 of FIG. 6). The BMC 144 causes NIC(s) 160 to be re-programmed with a new MAC address such that NIC(s) 160 forward received network packets to BMC 144. BMC 144 analyzes the network packets for matches to threat signatures 322 and 324 (block 606).

Referring to the flow chart of FIG. 8, method 800 begins at the start block and proceeds to block 802 where BMC 144 triggers the NIC(s) 160 to transmit a copy of the network packets 330 to BMC 144 via sideband bus 148. BMC 144 receives the copy of the network packets (block 804).

BMC 144 retrieves receive packet statistics 342 over several time periods for the received network packets from BMC memory 145 (block 806). The receive packet statistics include the number of network packets received in a time period for each internet protocol (IP) address and each physical address. BMC 144 determines a threshold number of network packets received for a time period (receive packet threshold 344) from each of the addresses (block 808). At decision block 810, BMC 144 determines if the received number of network packets in a time period is greater than the threshold number of network packets.

In response to the number of received network packets in a time period not being greater than the receive packet threshold 344, method 800 ends. In response to the number of received network packets in a time period being greater than the receive packet threshold 344, BMC 144 identifies the network packets corresponding to the address associated with exceeding the receive packet threshold as suspect network packets (block 812) and initiates an analysis of the suspect network packets (block 814). Method 800 then proceeds to block 704 of FIG. 7.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of identifying communication threats in an information handling system (IHS), the method comprising:
   triggering a board management controller (BMC) to transmit a plurality of memory addresses identifying where a plurality of network packets received by the IHS are stored;
   receiving, via a field programmable gate array (FPGA) within a processor, the memory addresses of the network packets;
   retrieving, by the FPGA, the network packets;
   analyzing, by the FPGA, the network packets by comparing at least one threat signature that is associated with undesired network behavior with the contents of the network packets;
   in response to the at least one threat signature matching the contents of at least one of the network packets, transmitting, by the FPGA, an intrusion alert to the BMC and reprogramming one or more NIC(s)(network interface controller) associated with receipt of the network packets that match a threat signature with a media access control (MAC) address of a sideband bus, such that NIC(s) forward received network packets to the BMC via a sideband bus; and
   responsive to receiving the intrusion alert, triggering, via the BMC, re-programming of at least one network interface controller (NIC) with a new media access control address (MAC), such that the at least one NIC forwards received network packets to the BMC to enable the BMC to analyze the network packets.

2. The method of claim 1, further comprising:
   retrieving a rules engine database that contains the at least one threat signature from among a plurality of threat signatures; and
   applying the rules engine database in the analyzing of the network packets.

3. The method of claim 1, further comprising:
   responsive to receiving the intrusion alert, transmitting, via the BMC, at least one simple network management protocol (SNMP) trap to a network management computer to alert the network management computer of the intrusion.

4. The method of claim 1, further comprising:
   responsive to receiving the intrusion alert, the BMC triggering the IHS to shutdown.

5. The method of claim 1, further comprising:
   receiving, via the BMC, the network packets forwarded from the NIC;
   analyzing, via the BMC, the network packets by comparing at least one threat signature that is associated with undesired network behavior with the contents of the network packets; and
   in response to the at least one threat signature matching the contents of at least one of the network packets, performing at least one of: transmitting a SNMP trap to a network management computer to alert the network management computer of a communication threat, such that network management computer can take appropriate action; and triggering the IHS to shutdown.

6. The method of claim 1, further comprising:
   receiving, via the BMC, the network packets forwarded from the NIC;
   analyzing, via the BMC, the network packets by matching at least one threat signature that is associated with undesired network behavior with the contents of the network packets;
   in response to the at least one threat signature not matching the contents of at least one of the network packets, determining if a number of received network packets during a time period from a same address is greater than a threshold number of received network packets, indicative of a denial of service attack; and
   in response to the number of received network packets from the same address during the time period being greater than the threshold number, the BMC: identifying the network packets corresponding to the address associated with exceeding the receive packet threshold as suspect network packets; and initiating an analysis of the suspect network packets.

7. The method of claim 6, where the determining includes:
   retrieving receive packet statistics over several time periods for the received network packets from BMC memory, the received packet statistics including a number of network packets received in a time period for each internet protocol (IP) address and each physical address.

8. An information handling system (IHS) comprising:
   a processor and a memory device communicatively coupled to the processor via a platform controller hub (PCH), the processor having a field programmable gate array (FPGA), the processor further communicatively coupled to a board management controller (BMC) via the PCH, the FPGA including firmware executing thereon to enable identification of communication threats contained in received network packets, wherein the firmware configures the FPGA to:
   trigger the BMC to transmit a plurality of memory addresses identifying where a plurality of network packets received by the IHS are stored;
   receive the memory addresses of the network packets;
   retrieve the network packets from the memory device;
   analyze the network packets by comparing at least one threat signature that is associated with undesired network behavior with the contents of the network packets;

in response to the at least one threat signature matching the contents of at least one of the network packets, transmit an intrusion alert to the BMC and reprogram one or more NIC(s) (network interface controller) associated with receipt of the network packets that match a threat signature with a media access control (MAC) address of a sideband bus, such that NIC(s) forward received network packets to the BMC via the sideband bus; and in response to the BMC receiving the intrusion alert, trigger, by the BMC, at least one network interface controller (NIC) to be re-programmed with a new media access control address (MAC) such that the at least one NIC forwards received network packets to the BMC to enable the BMC can analyze the network packets.

9. The information handling system of claim 8, wherein the firmware further configures the FPGA to:
retrieve a rules engine database that contains the at least one threat signature from among a plurality of threat signatures; and
applying the rules engine database in determining.

10. The information handling system of claim 8, wherein responsive to the BMC receiving the intrusion alert, the BMC transmits at least one simple network management protocol (SNMP) trap to a network management computer.

11. The information handling system of claim 8, wherein responsive to the BMC receiving the intrusion alert, the BMC triggers the IHS to shutdown.

12. The information handling system of claim 8, wherein the NIC is coupled to the BMC via the sideband bus.

13. The information handling system of claim 8, wherein the BMC includes firmware executing thereon to enable identification of communication threats contained in received network packets, wherein the firmware configures the BMC to:
receive the network packets forwarded from the NIC;
analyze the network packets by comparing at least one threat signature that is associated with undesired network behavior with the contents of the network packets; and
in response to the at least one threat signature matching the contents of at least one of the network packets, the BMC performs at least one of: transmitting a SNMP trap to a network management computer to alert the network management computer of a communication threat, such that network management computer can take appropriate action; and triggering the IHS to shutdown.

14. The information handling system of claim 8, wherein the BMC includes firmware executing thereon to enable identification of communication threats contained in received network packets, wherein the firmware configures the BMC to:
receive the network packets forwarded from the NIC;
analyze the network packets by matching at least one threat signature that is associated with undesired network behavior with the contents of the network packets;
in response to the at least one threat signature not matching the contents of at least one of the network packets, determine if a number of received network packets during a time period from a same address is greater than a threshold number of received network packets, indicative of a denial of service attack; and in response to the number of received network packets from the same address during the time period being greater than the threshold number of received network packets identifying the network packets corresponding to the address associated with exceeding the receive packet threshold as suspect network packets; and initiating an analysis of the suspect network packets.

15. An information handling system (IHS) comprising:
a processor and a memory device communicatively coupled to the processor via a platform controller hub (PCH), the processor further communicatively coupled to a board management controller (BMC) via the PCH, the BMC including firmware executing thereon to enable identification of communication threats contained in received network packets, wherein the firmware configures the BMC to:
in response to the BMC receiving an intrusion alert, trigger at least one network interface controller (NIC) to be re-programmed with a new media access control address (MAC) such that the at least one NIC forwards received network packets to the BMC to enable the BMC can analyze the network packets;
trigger at least one NIC to transmit a plurality of network packets to the BMC via a sideband bus;
receive the network packets from the NIC;
analyze the network packets by comparing at least one threat signature that is associated with undesired network behavior with the contents of the network packets; and
in response to the at least one threat signature matching the contents of at least one of the network packets, reprogram one or more NIC(s) associated with receipt of the network packets that match a threat signature with a media access control (MAC) address of a sideband bus, such that NIC(s) forward received network packets to the BMC.

16. The information handling system of claim 15, wherein the firmware further configures the BMC to:
track a plurality of statistics for the network packets, the statistics including a number of network packets received in a time period for each internet protocol (IP) address and each physical address;
determine a threshold number of network packets received from each of the addresses;
determine if the number of received network packets is greater than the threshold number of network packets; and
in response to the number of received network packets being greater than the threshold number of network packets: identify the network packets corresponding to the address associated with exceeding the threshold as suspect network packets; and initiate an analysis of the suspect network packets.

17. The information handling system of claim 15, wherein the firmware further configures the BMC to:
in response to the at least one threat signature matching the contents of at least one of the network packets, perform at least one of:
transmit a SNMP trap to a network management computer to alert the network management computer of a communication threat, such that network management computer can take appropriate action; and
trigger the IHS to shutdown.

* * * * *